United States Patent
Cole et al.

(10) Patent No.: US 9,659,224 B1
(45) Date of Patent: May 23, 2017

(54) MERGING OPTICAL CHARACTER RECOGNIZED TEXT FROM FRAMES OF IMAGE DATA

(71) Applicant: Amazon Technologies, Inc., Reno, NV (US)

(72) Inventors: Matthew Joseph Cole, Arlington, MA (US); Sonjeev Jahagirdar, Somerville, MA (US); Matthew Daniel Hart, Cambridge, MA (US); David Paul Ramos, Somerville, MA (US); Ankur Datta, Cambridge, MA (US); Utkarsh Prateek, Natick, MA (US); Emilie Noelle McConville, Boston, MA (US); Prashant Hegde, Seattle, WA (US); Avnish Sikka, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/230,471

(22) Filed: Mar. 31, 2014

(51) Int. Cl.
G06K 9/18 (2006.01)
G06K 9/00 (2006.01)

(52) U.S. Cl.
CPC ..................... *G06K 9/18* (2013.01)

(58) Field of Classification Search
CPC ........................................................ G06K 9/18
USPC ....................................................... 382/182
See application file for complete search history.

(56) References Cited

U.S. PATENT DOCUMENTS

| | | | | |
|---|---|---|---|---|
| 6,473,522 | B1 * | 10/2002 | Lienhart ................ | G06K 9/325 382/164 |
| 2004/0146199 | A1 * | 7/2004 | Berkner ................. | G06T 11/60 382/176 |
| 2008/0025608 | A1 * | 1/2008 | Meunier ............ | G06K 9/00449 382/181 |

OTHER PUBLICATIONS

Case, Carl, et al. "Autonomous sign reading for semantic mapping." Robotics and Automation (ICRA), 2011 IEEE International Conference on. IEEE, 2011. Accessed on Feb. 3, 2015 at http://ieeexplore.ieee.org/xpls/abs_all.jsp?arnumber=5980523&tag=1.*

(Continued)

*Primary Examiner* — Utpal Shah
*Assistant Examiner* — Kate R Duffy
(74) *Attorney, Agent, or Firm* — Weaver Austin Villeneuve & Sampson LLP

(57) ABSTRACT

Disclosed are techniques for merging optical character recognized (OCR'd) text from frames of image data. In some implementations, a device sends frames of image data to a server, where each frame includes at least a portion of a captured textual item. The server performs optical character recognition (OCR) on the image data of each frame. When OCR'd text from respective frames is returned to the device from the server, the device can perform matching operations on the text, for instance, using bounding boxes and/or edit distance processing. The device can merge any identified matches of OCR'd text from different frames. The device can then display the merged text with any corrections.

18 Claims, 6 Drawing Sheets

(56) References Cited

OTHER PUBLICATIONS

W. Garage, PR2 user manual. [Online]. Accessed on Feb. 3, 2015 at http://pr2support.willowgarage.com/wiki/PR2 Manual.*
WinMerge, Manual, WinMerge. [Online] Dec. 2010. Accessed on Feb. 3, 2015 <http://manual.winmerge.org/Compare_files.html>.*
Agarwal, Amit. "Use Your Mobile Phone to Scan Business Cards." digital inspiration. [Online]., Jul. 14, 2011. Web. Accessed on Feb. 3, 2015. <http://www.labnol.org/software/scan-business-cards-on-mobile/19792/>.*

* cited by examiner

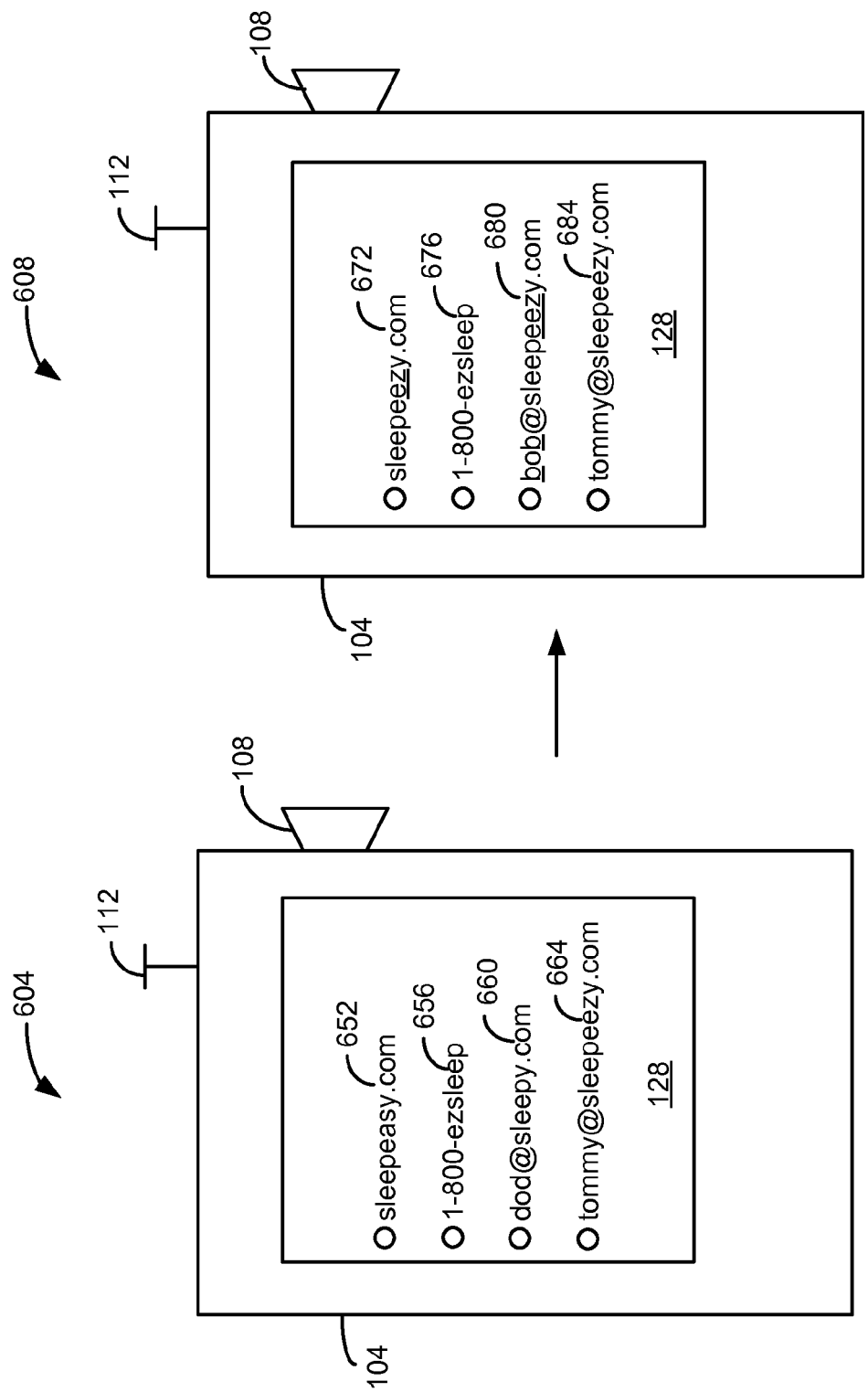

MERGING OPTICAL CHARACTER RECOGNIZED TEXT FROM FRAMES OF IMAGE DATA

BACKGROUND

Optical Character Recognition (OCR) generally refers to the identification of text in sources such as digital photos or scanned images and output of the identified text into computer-encoded and computer-readable textual data. OCR can be used to digitize text appearing in images so the Optical Character Recognized (OCR'd) text can be stored in computer memory, edited, searched, displayed, and used in automated processes. For example, OCR can be used in pattern recognition, artificial intelligence and computer vision. OCR'd text from digital photos and video frames can have inaccuracies due to inherent limitations of conventional OCR processes and due to problems with input image data such as lack of focus and contrast, incomplete textual strings, and other flaws of an image captured using a modern device. OCR inaccuracies can result in additional errors when attempting to perform processes on the OCR'd text such as machine translation, text-to-speech, key data extraction and text mining.

BRIEF DESCRIPTION OF DRAWINGS

FIG. 6 shows examples of display states 604 and 608 on a user's device showing updates to output OCR'd text determined using matching and merging operations, in accordance with some implementations.

DETAILED DESCRIPTION

Figure 1:
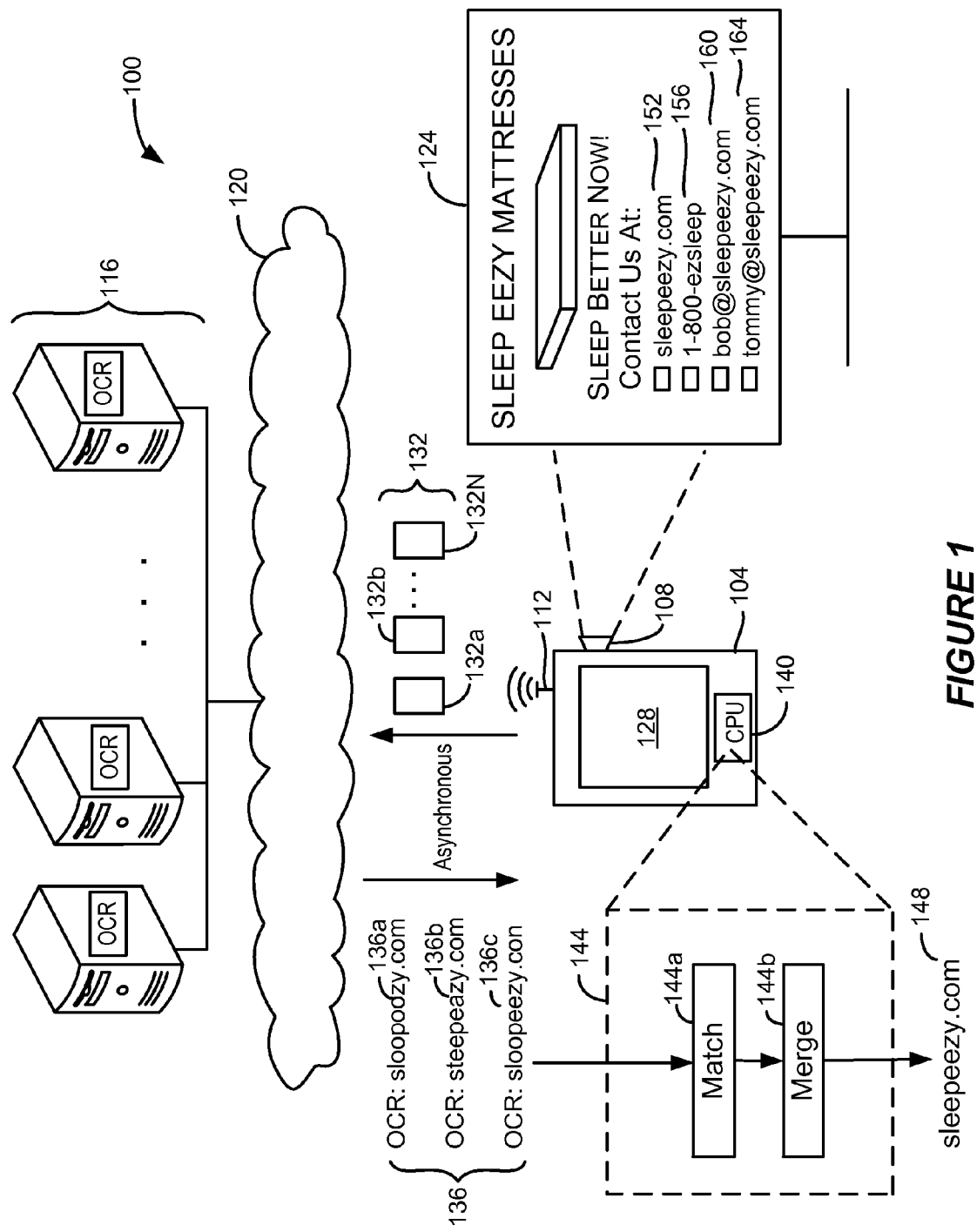
FIG. 1 shows an example of an OCR system 100 in which OCR'd text from frames of image data can be merged, in accordance with some implementations.

This disclosure describes techniques for improving accuracy of Optical Character Recognized (OCR'd) text by merging OCR'd text from two or more frames of image data. In some implementations, OCR'd textual entities appearing in two or more frames of the same general scene can be identified as matches, that is, pertaining to the same item appearing in different frames, before being merged to improve accuracy rates. "Merging" generally encompasses the combination of recognized text in one frame with recognized text in another frame. For example, the string, "bob" recognized in one frame can be merged with "b@acme.com" recognized in another frame, when those items are identified as matches, to produce "bob@acme.com". Merging also generally encompasses the correction of OCR errors when combining results from two or more frames. Thus, "bad@acme.com" recognized in one frame can be combined with "bob@acme.con" appearing in another frame to produce "bob@ acme.com". In some implementations, OCR'd text displayed on a user interface (UI) of a user's computing device can be continuously updated to reflect corrections identified by performing the matching and merging operations on a sequence of frames. Some of the disclosed techniques are capable of reducing latency as well as minimizing network bandwidth and device resource usage when compared with conventional single-frame approaches.

For example, a client device such as a camera-enabled smartphone or other mobile device equipped with a camera captures frames of image data as still images or as a video stream, for instance, by a user aiming the device at a scene and snapping digital photos or recording video of the scene. As frames are captured, the client device can send the frames to a server device configured to recognize text in each frame by performing Optical Character Recognition (OCR) on the data of each frame to generate OCR'd text for the frame. The server can send the OCR'd text of each frame back to the client device for additional processing such as merging and presentation to the user, for instance, in a UI on a display of the client device.

In some implementations, the OCR'd text or the merged text is processed for error correction, for instance, by passing the text through a semantic boosting stage at the server or at the client to attempt to correct mistakes made during OCR. "Semantic boosting" generally refers to changing OCR'd text based on one or more semantic properties of the text. By way of example, spell-checking can be performed. In another example, confidence values output by an OCR processing engine which has recognized a word or character can be used as explained in greater detail below. In another example, a correcting engine implemented at a client device or at a server device can check to determine if an OCR'd domain name is the same as or similar to popular domain names stored in a database. The domain name "acne.com" could be identified as "acme.com" and changed accordingly.

In some implementations, servers handling the OCR processing are stateless, and the client is configured to asynchronously send requests for OCR processing to the server to provide latency benefits. For example, frames identified by a client can be sent to an array of servers, so each frame can be OCR'd simultaneously. The client can send each frame as soon as the frame is captured. Each frame can be separately processed by a server, and OCR'd text from each frame can be sent back to the client. The client can perform synchronization to decipher the results and merge text when appropriate.

Some disclosed implementations provide client devices with the capability to intelligently merge OCR'd text frame different frames. Thus, if some of a textual string in a first frame is correctly identified, and some different portion of the textual string in a second frame is correctly identified, the OCR'd text from both frames can be merged to achieve a lower error rate than accepting the OCR'd text of either one of the frames. For example, a user attends a sporting event and uses his smartphone to snap several digital photos of a billboard, which includes relatively big letters and relatively small letters. In one frame, the big letters are crisp (in focus and with good contrast), but the small letters are blurry. OCR is performed on the entire frame to correctly identify the big letters but incorrectly identify the small letters. A second frame of the same billboard is re-focused on the smaller text, resulting in a correct identification of the smaller text. Combining both results using one or more of the disclosed techniques can result in a correct identification of the entire billboard content.

Some of the disclosed techniques for matching can be useful in some scenarios where multiple textual items are present in the same scene. For example, a single frame might contain two e-mail addresses: "mathcol@acme.com" and "ramdavi@acme.com". If a second frame contains "ramdavid@acme.com" and "matthcol@acme.com", matching can be performed to pair mathcol@acme.com with matthcol@acme.com and ramdavi@acme.com with ramdavid@acme.com before merging characters of the respective pairs.

In some implementations, when a user focuses his device's camera on a scene containing text, this initiates a session in which frames are collected and processed using the disclosed techniques. As soon as the first OCR result is returned from the server, this result can be presented to the user on the device's display. As subsequent OCR results are returned, matching and merging can be practiced to combine the results currently being shown to the user with the later-returned results. In some implementations, when a later result is different from a current result, confidence data can be generated for each result and compared to determine whether to update the display to show the later result. By way of example, if the later result is the same as the current result, or if the confidence of the later result is less than the confidence of the current result, the display is not updated since the user is currently being shown the best result. When later results have a greater confidence, a framework is provided to continuously augment incorrect results and make them more correct over time.

FIG. 1 shows an example of an OCR system 100 in which OCR'd text from frames of image data can be merged, in accordance with some implementations. In FIG. 1, a mobile device in the form of a smartphone 104 including a camera 108 is carried by a user. The smartphone 104 is one example of various types of devices, which can be configured to perform one or more of the techniques disclosed herein. For example, as an alternative to a smartphone, the user's device can be a wearable display device, a tablet, a laptop, or a desktop computer system. In this example, smartphone 104 includes an antenna 112 in wireless communication with a plurality of servers 116 via a network 120. Those skilled in the art should appreciate that network 120 can be in the form of any number of networks combined to provide communication between servers 116 and any number of client devices, such as smartphone 104. In FIG. 1, network 120 represents any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc.

In FIG. 1, the user can point camera 108 of smartphone 104 at any of various physical objects. In this example, the user has aimed camera 108 at a roadside billboard 124. The billboard 124 includes an advertisement for mattresses, as shown in FIG. 1. The camera 108 of smartphone 104 is operable to capture snapshots of billboard 124 as frames, for instance, when the user presses a selection on a touch screen 128 of smartphone 104. The captured image of billboard 124 can be binarized, for example, to provide image data of each frame. In this example, the binarization is performed by smartphone 104 to generate frames 132 of digital image data.

In other examples, smartphone 104 is configured to shoot video of any physical objects such as billboard 124 using camera 108. In some other examples, smartphone 104 is capable of receiving streamed video over network 120. In such examples, frames 132 are frames of such video data. Thus, the disclosed techniques are applicable to both live camera feeds as well as clusters of still images captured by taking individual snapshots of a scene. Also, in some implementations, frames of image data are captured automatically by smartphone 104, that is, without user input causing snapshots or video to be captured.

In FIG. 1, as soon as a frame 132a has been captured by smartphone 104, smartphone 104 can transmit frame 132a to any of servers 116. As additional frames 132b-132N are captured, these frames can also be separately transmitted from smartphone 104 to servers 116. The servers 116 are configured with OCR processing engines to perform OCR on frames of image data received from devices such as smartphone 104. In some implementations, servers 116 are also configured to perform error correction on OCR'd text from a frame. Results 136 of OCR'd text from frames of image data can be sent from servers 116 back to smartphone 104 as soon as such results are obtained, as shown in FIG. 1. The smartphone 104 has one or more processing modules, for example, in the form of a CPU 140 configured to perform additional processing on OCR'd text results 136 from servers 116.

As mentioned above, servers 116 are stateless. One or more of servers 116 are configured to perform OCR as soon as the frame is received and immediately return the OCR'd text as a result to a client device, which sent the frame to the server. In some implementations, smartphone 104 transmits frames 132 to servers 116 for processing as soon as each frame is available to be sent. That is, in some implementations, the client device does not wait for OCR'd results of a first frame such as frame 132a to be returned before transmitting a second frame, such as frame 132b. by the same token, the client device does not need to wait for OCR'd results before taking additional snapshots of a scene and transmitting frames of those snapshots to servers 116 for processing. Thus, the sending of frames 132 and the receiving of OCR'd results 136 between smartphone 104 and servers 116 is asynchronous, in the example of FIG. 1. A client device such as smartphone 104 listens for and processes results 136 asynchronously with respect to sending frames 132.

In FIG. 1, as explained in greater detail below, as results 136 are received by smartphone 104, smartphone 104 includes processing modules 144 including a matching engine 144a, and a merging engine 144b adapted to process OCR'd results 136 to arrive at a more accurate textual output 148, as shown in FIG. 1. By implementing processing modules 144 on a client device such as smartphone 104, and sending and receiving data between the client device and servers in an asynchronous manner, results can be processed and output, for example, on display 128 of smartphone 104 with minimal latency so the user can see results and act on them without having to wait.

Figure 2:
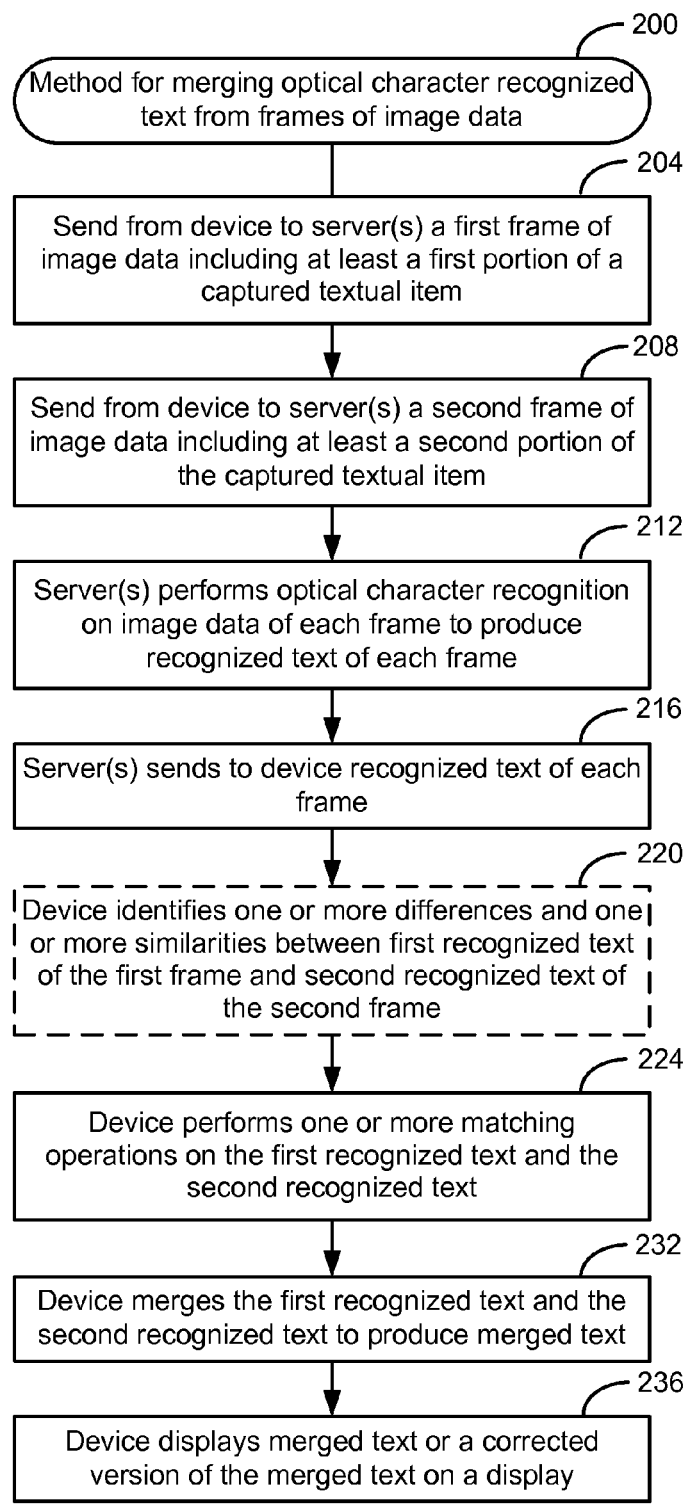
FIG. 2 shows an example of a method 200 for merging OCR'd text from frames of image data, performed in accordance with some implementations.

FIG. 2 shows an example of a method 200 for merging OCR'd text from frames of image data, performed in accordance with some implementations. While not shown, in some implementations, method 200 can be adapted to include one or more pre-processing stages, that is, before operations described below at 204, 208, etc. are performed. Pre-processing can include frame selection to identify one or more frames of a larger set that accurately depict text of interest or objects including text of interest. That is, frames are desirably selected that are sufficiently clear. For example, in FIG. 1, smartphone 104 can be configured to select frames based on quality, for instance, using parameters such as focus, contrast, etc. An additional processing engine implemented by CPU 140 of smartphone 104 can automatically select frames based on such parameters. In some other implementations, frames are selected manually, for example, by a user tapping on selected frames displayed on display 128. In such implementations, frames 132 transmitted to servers 116 would include only the selected frames. These frame selection techniques can be applied to both sequences of still images, as well as video streams of text in scenes being captured by camera 108.

Figure 3:
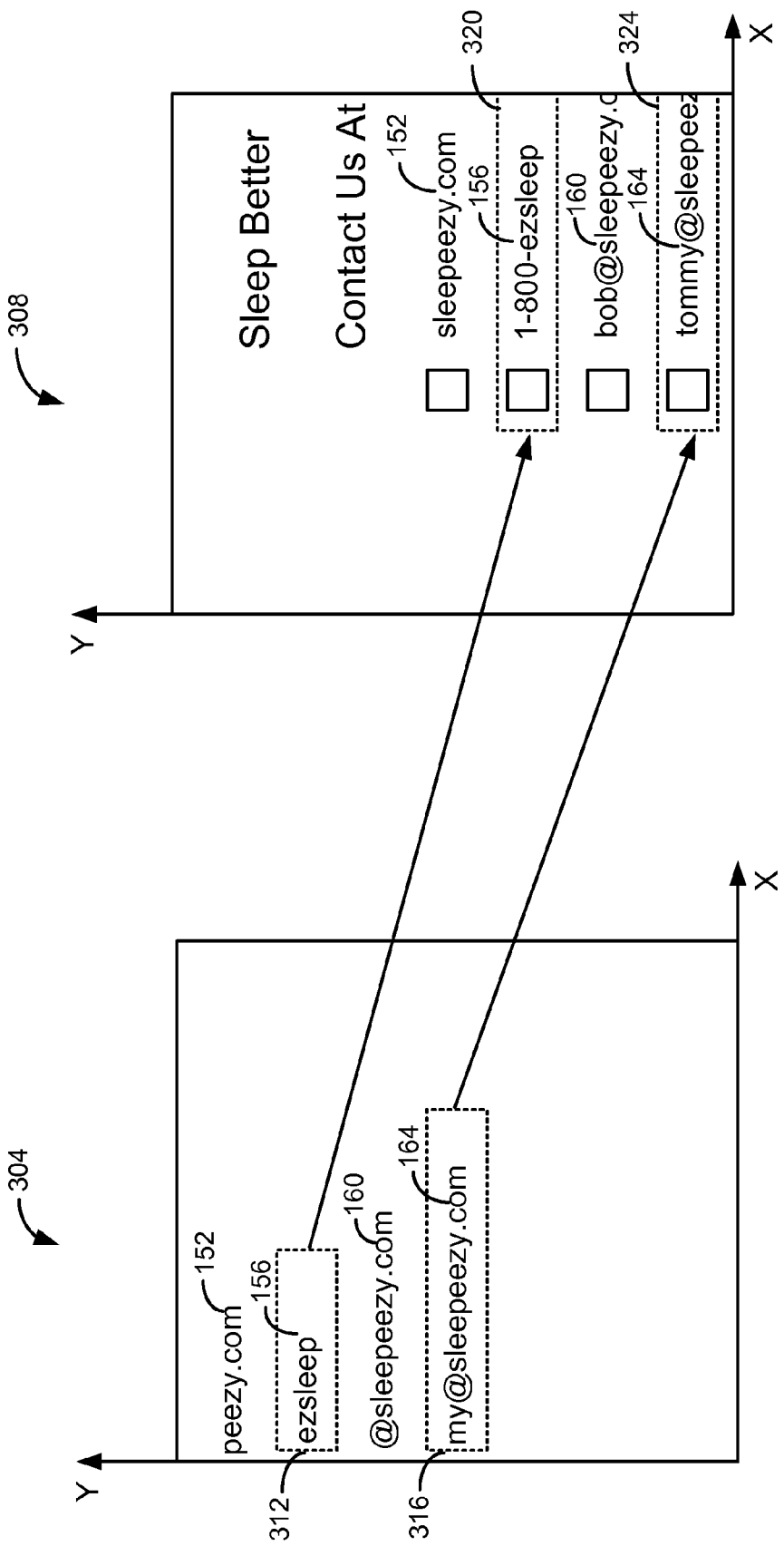
FIG. 3 shows examples of captured frames 304 and 308 of image data, in accordance with some implementations.

In FIG. 2, at 204, a client device such as smartphone 104 sends a first frame of image data, such as frame 132a, to servers 116. The frame 132a includes part or all of a textual item captured by camera 108. For example, FIG. 3 shows examples of captured frames 304 and 308 of image data, in accordance with some implementations. In FIG. 3, a uniform resource locator (URL) 152 on billboard 124 of FIG. 1 is a textual item, a portion of which has been captured in frame 304.

Returning to FIG. 2, regardless of the stage of processing and return of frames by one or more servers 116, at 208, smartphone 104 sends a second frame 132b of image data including a least a second portion of the textual item as described at 204 above. For example in FIG. 3, frame 308 includes all of URL 152. In some implementations, frames 132a and 132b of FIG. 1 are transmitted in quick succession, that is, immediately following the capture of the individual frames. For example, frame 132a is transmitted immediately following its capture, while frame 132b, captured 500 milliseconds after frame 132a, is transmitted immediately thereafter. In some other implementations, a set of frames can be transmitted simultaneously from the client device to servers 116, for example, when all of such frames were previously stored on a memory device within smartphone 104 and can be retrieved.

In FIG. 2, at 204 and 208, in some implementations, a client device such as smartphone 104 is configured to identify a region of a frame as including text, without having to recognize the text. In such implementations, rather than sending an entire frame, the client device sends only a portion of the image data including the identified region to the server. Sending portions of image data in some scenarios can be desirable to reduce bandwidth, by way of example.

In FIG. 2, at 212, any of servers 116 perform OCR on the image data of a given frame such as frame 132a or 132b to produce recognized text of that frame. For example, in FIG. 1, one of servers 116 has recognized "sleepeezy.com" URL 152 as "sloopoozy.com" 136a. By the same token, one or more of servers 116 has recognized the same URL 152 appearing in frames 132b and 132N as "steepeazy.com" 136b and "sloopeezy.con" 136c as the recognized text of frames 132b and 132N.

In FIG. 1, in some implementations, in addition to performing OCR on a frame, a server performs additional error correction on the recognized text before delivering results 136 to a client, such as smartphone 104. At 216 of FIG. 2, a server returns the recognized text such as result 136a, 136b, or 136c of a particular frame 132a, 132b, or 132N to a client device such as smartphone 104. In some implementations, when error correction is performed by a server, the server is configured to return both raw (uncorrected) recognized text and corrected text to a client device. In some implementations, as soon as smartphone 104 receives recognized text of a given frame, such as result 136a of frame 132a, smartphone 104 displays the received text on display 128. In some implementations when both corrected and uncorrected recognized text is returned to smartphone 104, the corrected text can be displayed on display 128, and the uncorrected text can be saved to a memory device in smartphone 104 for later processing.

In some implementations, before displaying recognized text on display 128, CPU 140 can be configured to make one or more determinations and/or receive user input to gauge whether recognized text of a frame has a higher confidence level than recognized text of a preceding frame or frames. For example, in FIG. 1, CPU 140 can be configured to perform processing to determine whether result 136b of frame 132b has a higher confidence than result 136a of frame 132a before updating display 128 to replace result 136a with result 136b. In situations where result 136b has a lower confidence than result 136a, result 136a will continue to be displayed on display 128.

In FIG. 2, at 220, in some implementations, a client device such as smartphone 104 of FIG. 1 begins the processing of modules 144 by identifying one or more differences and one or more similarities between recognized text of different frames, For example, results 136a and 136b can be processed to recognize the common characters of "s" "p" and "y". The various differences among the characters in results 136a-136c as shown in FIG. 1 can also be identified. Method 200 then proceeds to 224 at which one or more matching operations can be performed on the recognized text from different frames. In situations where the processing at 220 is omitted, in some implementations, the processing of OCR'd results begins with matching at 224.

In FIG. 2, at 224, one or more techniques can be practiced to perform matching, for example, at matching engine 144a of FIG. 1. In one example, matching can be based on overlapping bounding boxes of textual entities from one frame to another. As explained in greater detail below, an entity can be positioned in a certain region at a certain set of coordinates in one frame and at a different region in another frame. A transformation from one frame to another can be calculated using a change in homography between the frames, for example. Entities with bounding boxes having the most overlap between frames can be identified as matches and thus serve as candidates to be merged later in the processing pipeline.

In FIG. 1, when recognized text from different frames is identified as a match, for example, when result 136b is identified as a match of result 136a, the recognized text from one frame can be matched with text from another frame. At 232, matching text from 224 can then be merged, for example, by merging engine 144b of FIG. 1 to produce merged text. Thus, in the example of FIG. 1, results 136a-136c can be processed by engines 144a-144b to arrive at merged text 148, "sleepeezy.com".

In some implementations, after 232 is performed, merged text output from merging engine 144b can be transmitted from smartphone 104 back to a server for semantic processing and other types of error correction before the corrected text is sent from a server back to smartphone 104. In FIG. 2, at 236, a client device such as smartphone 104 can display merged text 148 or a corrected version of the merged text on display 128.

It should be noted that, in some instances, text recognized in one frame does not appear in or is not recognized in another frame. For example, returning to FIG. 1, item 152 on billboard 124 may be captured in frame 132a, but none of item 152 is captured in frame 132b. In some implementations, text recognized in one frame but not another is categorized as "new" and thus displayed even though the matching and/or merging operations techniques disclosed herein have not been performed. Such can be desirable to display to a user as many actionable items as possible when processing sequences of frames. In some other instances, it can be desirable to be more selective as to which actionable items to display. Thus, in some implementations, items are only displayed if they appear in a designated number of frames.

Those skilled in the art should appreciate that one or more operations of method 200 can be repeated any number of times to match and merge text from additional frames using the techniques described above.

Returning to FIG. 3, a homography can be determined between frames 304 and 308 because frames 304 and 308 are captures of the same scene but with possibly different translations, rotations, and scales. In FIG. 3, a transformation can be calculated as feature points such as individual letters in frame 304 are translated to corresponding points in frame 308, for instance, using computer vision techniques. Since frames 304 and 308 are different captures of the same scene including billboard 124 of FIG. 1, the disclosed techniques can compensate for camera movement between frames. In the example of FIG. 3, the transformation can be applied to transform box 312 containing the "ersleep" portion of "1-800-ersleep" into a space occupied by box 320 containing the entire string, "1-800-ersleep." Thus, even though the camera has moved between frames 304 and 308, box 320 in frame 308 is identified as containing the corresponding entity or item in box 312 of frame 304. The same is true for corresponding boxes 316 and 324 of frames 304 and 308.

By way of illustration, when the scene in a frame has shifted to the right along the X axis by 100 pixels and down along the Y axis by 50 pixels between frames 304 and 308 due to corresponding camera movement, the bounding boxes around items in the image have shifted the same number of pixels along the X and Y axes. Computing this pixel transformation, it is determined that bounding box 312 overlaps with box 320 in the coordinate space of frame 308, as is the case with boxes 316 and 324, so the text within overlapping bounding boxes can be compared. The calculated overlap serves as an indication that items contained in the corresponding bounding boxes are captures of the same entity even in situations when the recognized text of the item contained in a bounding box is different from frame-to-frame. Returning to FIG. 1, such matches can then be merged by merging engine 144b at a client device, such as smartphone 104.

Returning to 224 of FIG. 2, another example of a matching technique, which can be used in addition to or as an alternative to bounding box processing, is determining and analyzing edit distance to translate characters in a string of recognized text of one frame to the characters in recognized text of another frame. For example, if bounding box processing fails or yields questionable results, edit distance can be calculated between the same items of text in the different frames. A threshold can be set so that, for example, entities of two frames can be considered matches of one another when the number of edits is less than or equal to the threshold. In FIG. 3, when the threshold is 3, for instance, item 160 in frame 304 can be identified as a match of item 160 in frame 308 since only 3 character edits, namely the addition of "bob" in frame 308 is performed to change the recognized text. Item 164 in frames 304 and 308 can also be identified as a match using the same threshold. However, since 4 character edits would be performed to translate items 152 and 156 from frames 304 to 308, such items would not be identified as matches using edit distance in this example. In another example, edit distance processing and bounding box processing can be performed simultaneously, and the outputs of both sets of processing can serve as metrics to determine whether items are matches.

Thus, in some implementations, textual entities in different frames can be identified as matches using bounding box and/or edit distance relationships. For example, when bounding box processing has been performed and entities in different frames are not identified as matches, edit distancing processing can be performed to determine if the entities are below some maximum number of characters apart. If the entities are within such a threshold, the entities can be identified as matches. The output of matching engine 144a of FIG. 1, for example, can thus be in the form of a pair of items appearing in a pair of frames that have been identified as related to one another.

Figure 4:
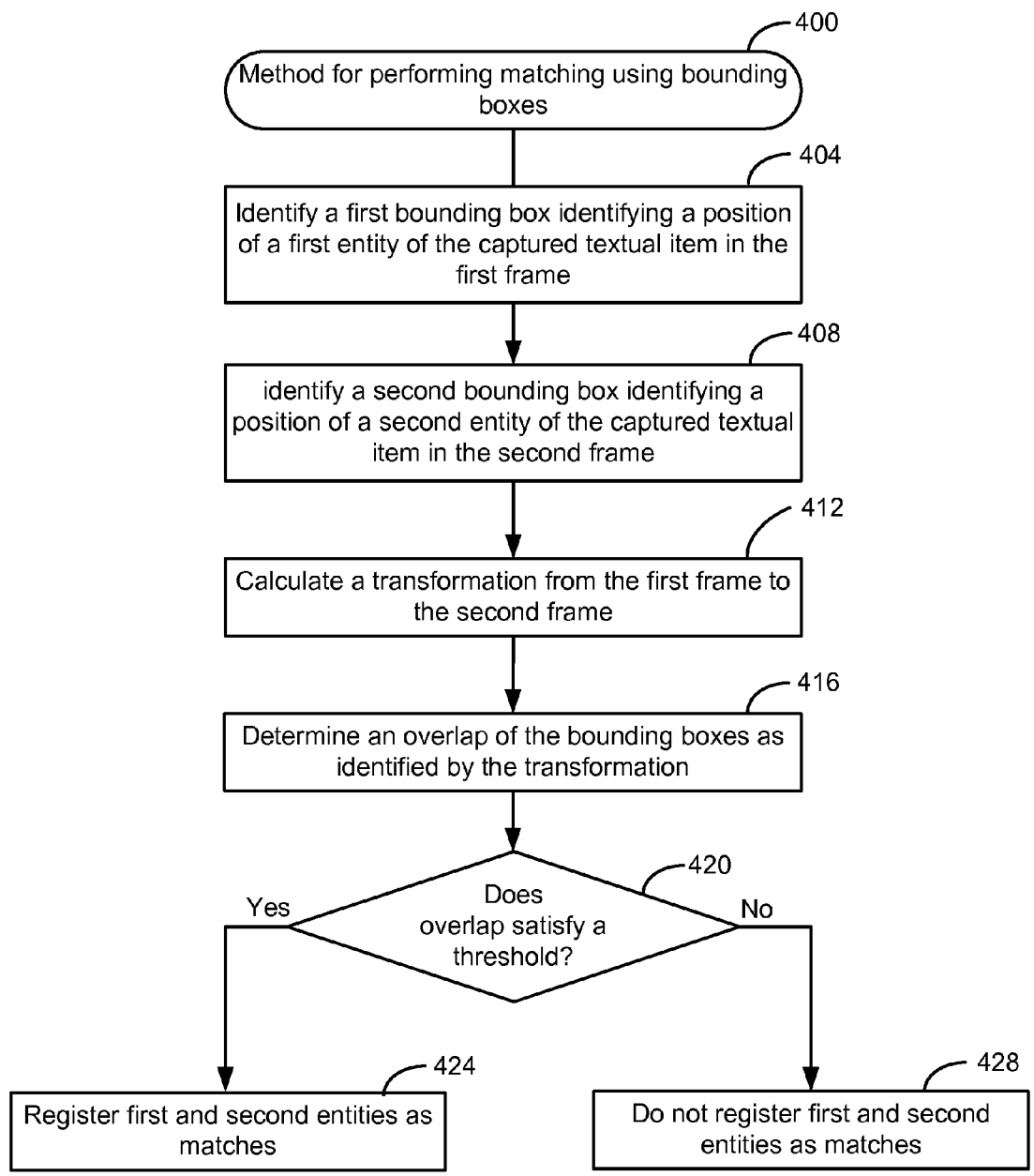
FIG. 4 shows an example of a method 400 for performing matching of textual entities using bounding boxes, performed in accordance with some implementations.

FIG. 4 shows an example of a method 400 for performing matching of textual entities using bounding boxes, performed in accordance with some implementations. In FIG. 4, the textual entities appearing across frames of the same general scene can be matched. By way of illustration, at 404, bounding box 312 of frame 304 in FIG. 3 can identify a position in terms of X, Y coordinates of a first portion of item 156 captured from billboard of 124 of FIG. 1. At 404 in FIG. 4, a second box around items appearing in frame 308 can be identified. For example, boxes 320 and 324 can respectively identify X, Y coordinates of items 156 and 164 as captured in frame 308. At 412, a transformation from frame 304 to frame 308 can be calculated as explained above. At 416, overlaps between boxes 312 and 320 as well as between boxes 312 and 324 can be determined by performing the transformation at 412. At 420, in this example, matching engine 144a of FIG. 1 is configured to determine whether the overlaps determined at 416 meet or exceed some threshold. In this example, the overlap between boxes 312 and 320 of FIG. 3 satisfies the threshold and, thus, method 400 proceeds to 424 at which the contents of boxes 312 and 320 are registered as matches and identified as such, for instance, in a database table on a memory device. Returning to 420, when the overlap between boxes such as box 312 and 324 do not satisfy such a threshold, method 400 proceeds to 428 at which the contents of those boxes 312 and 324 are not registered as matches.

In the example of FIG. 3, both frames 304 and 308 include at least four textual items indicated by respective reference numerals 152, 156, 160 and 164. In some implementations, after performing a frame transformation as explained above, the items 152-164 in frame 308 can be treated as candidates to form a pair with a given item such as item 156 in frame 304. Thus, in an alternative implementation to method 400, at 416, an overlap can be calculated for each candidate in frame 308 paired with item 156 in frame 304. A pair having the most overlap can be identified as matches. In this example, box 320 has been identified as having the most overlap with box 312, and box 324 has been identified as having the most overlap with box 316. Thus, item 156 appearing in both frames 304 and 308 is identified as a match, as is item 164 in boxes 316 and 324.

In some other implementations, rather than comparing overlaps with a threshold, as described above with reference to 420 of FIG. 4, overlaps of pairs of different candidates in one frame can be compared with a given item in another frame, and the pair having the most overlap can be selected as matches. Thus, in the example of FIG. 4, the operations at 420, 424 and 428 can be replaced with such a comparison and selection. For example, rather than separately comparing the overlaps of boxes 312 and 320 as well as boxes 320 and 324 with a threshold, boxes 312 and 320 can be selected as having more overlap than boxes 312 and 324, such that text strings contained within boxes 312 and 320 can be identified as matches.

Figure 5:
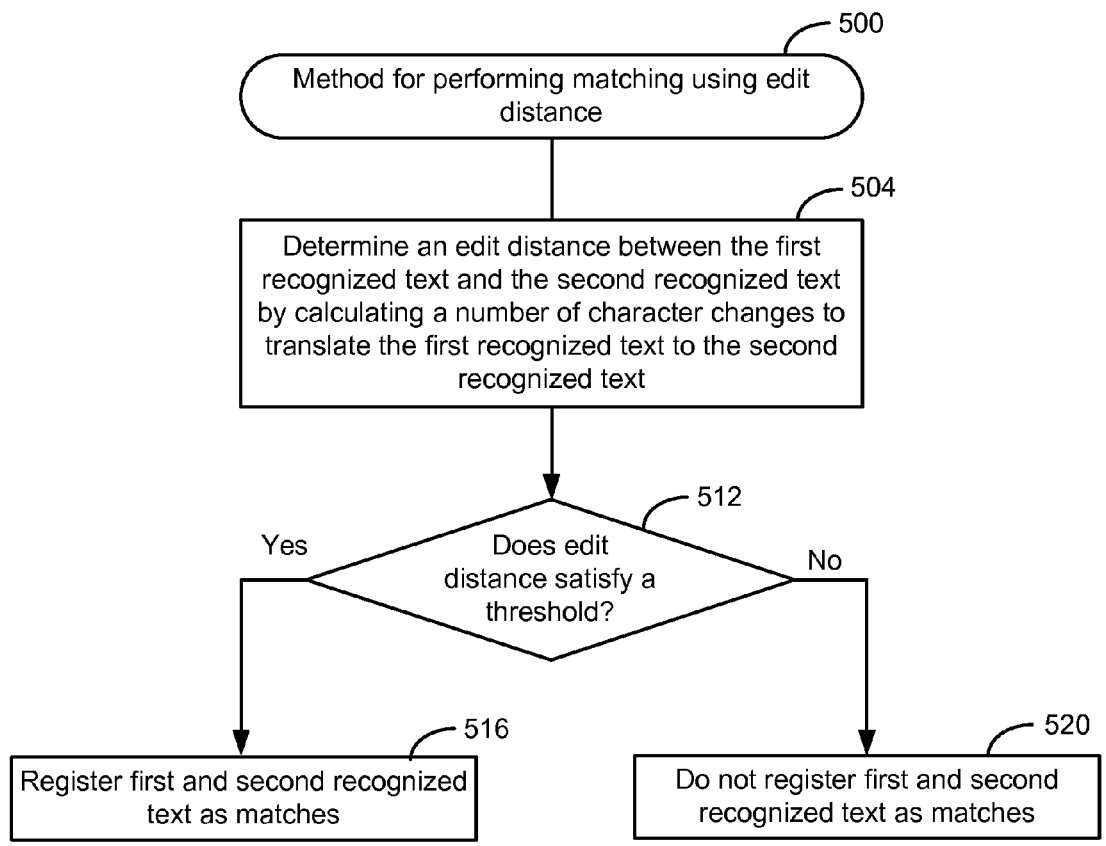
FIG. 5 shows an example of a method 500 for performing matching of textual entities using edit distance, performed in accordance with some implementations.

FIG. 5 shows an example of a method 500 for performing matching of textual entities using edit distance, performed in accordance with some implementations. In FIG. 5, at 504, one or more character changes to translate recognized text in one frame to recognized text in another frame can be determined. Thus, in the example of FIG. 3, the addition of letters "slee" to the portion of item 152 in frame 304 would translate to item 152 as appearing in frame 308. Thus, the edit distance of such a translation at 504 would be 3 character changes. At 512, the calculated edit distance can be compared with a threshold. In some implementations, the threshold for determining matches can be variable and be set based on one or more factors. The threshold can depend on the type of textual item being processed. For instance, URLs can have a higher threshold than an email address when textual items are identified as such. Thus, items containing the text "http:" can be assumed to be a URL, while items containing an "@" can be assumed to be emails. In another example, a higher threshold can be implemented for email addresses having the same domain name to qualify as matches than the threshold for identifying pairs of URLs as matches. Such can be desirable when one of more databases of domain names is available to be accessed for comparison with textual content.

At 512, when the edit distance satisfies a threshold, method 500 proceeds to 516, at which the textual items are registered as matches. At 512, when the edit distance does not satisfy the threshold, the textual items are not registered as matches at 520. As with method 400 described above, in some implementations, in addition or as an alternative to comparing edit distances with a threshold, edit distances between pairs of textual items from one frame to another can be compared with each other, such that a pair having the shortest or lowest edit distance would be registered as matches.

Those skilled in the art should appreciate that processes available as part of the Java commons framework such as the Levenshtein distance can be used to determine edit distances between strings of text. Pairs of textual strings having the closest or shortest edit distance, for example, using an $N^2$ calculation can be performed as part of the determination.

In some implementations, the matching techniques disclosed herein can be extended. For example, a relator can be configured to determine whether a textual entity from a recent frame has a match in a less recent frame. If so, the entity can be considered "new" and displayed to a user as a new textual recognized entity. Also, a relator can be configured to determine that there is no relationship between a textual entity in a recent frame with a textual entity in a less recent frame, and thus the entity can be characterized as "deleted". By way of example, entities characterized as deleted are eligible for being removed from display on the user's device. In some implementations, relators can be configured to identify relationships between two textual entities in a first frame and a single textual entity in a second frame, or vice-versa. For example, when a first frame contains a textual entity "matthcol.com" and an entity "mercial.com", and a second frame contains the textual entity "matthcol.commercial.com", the entities from the first frame can be coalesced and both identified as a match with the corresponding entity in the second frame.

In some implementations, a preliminary detector can be implemented as a pre-processing stage before any matching and/or merging as described above. For example, FIG. 1, the various results 136a-136c can be compared to identify any strings that are identical to each other. That is, if two results are already identified as being identical, those items can be linked and provided as output text to be displayed on display 128 without perform matching and/or merging as described above. Thus, the processing by engines 144a-144b of module 144 can be conditional such that processing is only activated when one or more differences exist between a pair of OCR'd results.

In some implementations, when displaying output text, that is, merged text or a corrected version of merged text, on a display of a user's device, it can be desirable to perform some processing to determine whether to update previously displayed text with newer output text by processing additional frames. For example, one or more update conditions can be implemented to determine whether to update the displayed text. Update conditions can be checked by comparing the previously displayed text with newer output text irrespective of user input, in some implementations.

For example, when one or more differences are identified between previously displayed text and new output text, respective confidence levels or scores of the previously displayed text and of the newer text can be compared. Thus, when the newer text has a greater or higher confidence, the previously displayed text is replaced with the newer text. Otherwise, the previously displayed text remains displayed. The confidence levels or scores can be determined by one or more of various methodologies. For example, an OCR engine on a server can be configured to assign a confidence level to any OCR'd text. In another example, semantic analysis of OCR'd text can be performed to derive a confidence level. In yet another example, determining a number of actionable components of text, that is, portions of text that are selectable by a user to cause a computing action or event to occur, can be a factor affecting the confidence level of the textual item. In another example, the textual item can be compared with a dictionary to determine how much of the item appears in the dictionary to derive a confidence level. Semantic confidence can be determined, for example, by determining whether an identified URL is valid, that is, would access a page when entered into a web browser, or in the case of a phone number, by performing a search of white pages to determine whether the phone number is valid. In some implementations, confidence levels can be affected by the length of the textual string. For example, if one identified email address has 10 characters, and a text string identified as a match has 7 characters, it can be assumed that the earlier text string was more accurate and of higher quality, thus causing the earlier text string to have a higher confidence score. That is, it is assumed that the corresponding frame is of higher quality and/or the OCR performed on that frame was more accurate.

In addition or as an alternative to any of the confidence level determining techniques described above, the matching operations disclosed herein can serve to determine a confidence level of text. For example, if part or all of the textual string is identified as a match across frames, that textual data can have a higher confidence level than other text.

In some implementations, only actionable text output by module 144a of FIG. 1 is displayed or highlighted on display 128 of a device such as smartphone 104, in FIG. 1. Thus, in the example of FIG. 6 described in greater detail below, only URLs, phone numbers and email addresses are displayed on display 128. Thus, in FIG. 6, any of items 652-664 and 672-684 can be separately selected by tapping on the displayed item to cause contact to be initiated. For example, tapping on item 672 causes the website "sleepeezy.com" to be loaded in a browser on smartphone 104. Similarly, tapping on item 656 causes the phone number "1-800-ersleep" to be dialed. Tapping on either of items 660 or 664 causes emails to be generated using an email application, with the emails addressed to the identified recipients. The same is generally true for items 672-684 when display 128 is updated.

FIG. 6 shows examples of display states 604 and 608 on a user's device showing updates to output OCR'd text determined using matching and merging operations, in accordance with some implementations. In FIG. 6, when previously displayed text is updated to reflect changes in newer text on display 128, a graphical effect can be applied to one or more character changes of the newer text being displayed. In this example, when display 128 is updated from state 604 to state 608, characters which have been modified are underlined in state 608. Thus, in the example of item 652, the characters "as" have been replaced with "ez" as underlined in item 672. No changes were made between items 656 and 676, and thus "1-800-ersleep" remains displayed in state 608. The same is true for "tommy@sleepeezy.com" in items 664 and 684. Changes to the email address in item 660 are reflected in item 680 with appropriate underlines.

In FIG. 6, other examples of graphical effects include highlighting, bolding, coloring and increasing the font size of replaced characters. By the same token, in some implementations, the entire text string can be graphically emphasized in such a manner. In some implementations, displayed text can have a treatment indicating some uncertainty with the output, for example, with the text having a translucent appearance. As additional results or output using the techniques disclosed herein with higher confidence are generated, and display 128 is updated accordingly, such results can be treated with a more opaque shading of added or changed letters, by way of example. Over successive iterations of processing additional frames in a set, the treatment can progress from a translucent effect to an increasingly darker effect to demonstrate to the user that the results are converging towards a final output with a higher degree of confidence.

In some implementations, user feedback can be generated and output on a user's device such as smartphone 104, for example, in cases where the confidence level of output text is relatively low. For example, when the user is aiming the camera of the device at the same general scene and the confidence is low, a message can be generated and output on display 128 to convey the low confidence level and instruct the user accordingly to move the device closer to the text in the scene and/or re-focus the camera to obtain a more accurate capture of the scene. In response to user input indicating that smartphone 104 has been moved closer or better focused, a new processing session for matching and merging OCR'd text from captured frames can be initiated. When the resulting output text is determined to be of higher confidence than previously displayed text, display 128 can be updated accordingly with any changes.

Various types of computing events that can be caused to occur by tapping or otherwise selecting an actionable text item displayed on display 128 include generating a social network post to a user or group of a social networking system as referenced by the displayed text, generating a text message to a person or phone number identified by the displayed text, and generating an instant message (IM) to be sent to a user identified by the displayed text using appropriate channels.

In some alternative implementations, one or more of the matching and/or merging operations described above can be performed by a server device as opposed to a client device. Thus, in such implementations, one or more of matching engine 144a and merging engine 144b can be implemented by an appropriate processor or processors on any of servers 116 in FIG. 1. In such implementations, a user's device such as smartphone 104 can similarly be configured to capture and send frames of image data to a server, which performs OCR on the received image data as described above. However, in such implementations, such matching and/or merging operations would be performed at the server before output text is delivered back to the user's device for display on display 128 in the example of FIG. 1.

It should be noted that, despite references to particular computing paradigms and software tools herein, computer program instructions on which various implementations are based may correspond to any of a wide variety of programming languages, software tools and data formats, and be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, references to particular protocols herein are merely by way of example. Suitable alternatives known to those of skill in the art may be employed.

Any of the components, modules, engines and operations described herein may be implemented at least in part as software code to be executed by a processor using any suitable computer language such as Java, C++ or Perl, by way of example only. The software code may be stored as a series of instructions or commands on a computer-readable medium for storage and/or transmission. Suitable computer-readable media include random access memory (RAM), read only memory (ROM), a magnetic medium such as a hard-drive or a floppy disk, an optical medium such as a compact disk (CD) or DVD (digital versatile disk), flash memory, and the like. The computer-readable medium may be any combination of such storage or transmission devices. Computer-readable media encoded with the software/program code may be packaged with a compatible device such as a client device or a server device as described above or provided separately from other devices. Any such computer-readable medium may reside on or within a single computing device or an entire computer system, and may be among other computer-readable media within a system or network. A computing device such as the client devices described above may include a monitor, printer, or other suitable display for providing any of the results mentioned herein to a user.

While the subject matter of this application has been particularly shown and described with reference to specific implementations thereof, it will be understood by those skilled in the art that changes in the form and details of the disclosed implementations may be made without departing from the spirit or scope of this disclosure. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope should not be limited by reference to such advantages. Rather, the scope should be determined with reference to the appended claims.

What is claimed is:

1. A non-transitory computer-readable storage medium storing instructions executable by one or more processors of a device to cause a method to be performed for merging recognized text from a plurality of frames of image data, the method comprising:
   sending, from the device to one or more servers in communication with the device via a network, at least a portion of a first frame of image data including a first portion of a scene having at least a first captured textual item, the first captured textual item within a first bounding box corresponding to a region of the first frame;
   receiving, from the one or more servers, first recognized text corresponding to the first captured textual item, the one or more servers having generated the first recognized text using optical character recognition;
   displaying the first recognized text on a display;
   sending, from the device to the one or more servers, at least a portion of a second frame of image data including a second portion of the scene having at least a second captured textual item, the second captured textual item within a second bounding box corresponding to a region of the second frame;
   receiving, from the one or more servers, second recognized text corresponding to the second captured textual item;
   determining an edit distance between the first recognized text and the second recognized text;
   determining that the edit distance satisfies an edit distance threshold, wherein the edit distance threshold depends on at least one of a type of the first recognized text or of the second recognized text;
   determining an overlap of the first bounding box relative with the second bounding box;
   determining that the first captured textual item matches the second captured textual item based at least in part on the edit distance and on the overlap;
   generating merged text based at least in part on the first recognized text and the second recognized text; and
   displaying the merged text on the display.

2. The non-transitory computer-readable storage medium of claim 1, wherein merging the first recognized text and the second recognized text to produce merged text comprises selecting a first portion of the first recognized text based at least in part on a first confidence level and selecting a second portion of the second recognized text based at least in part on a second confidence level.

3. The non-transitory computer-readable storage medium of claim 1, wherein determining the transformation of the first frame of image data to the second frame of image data comprises determining a homography corresponding to the first and second frames of image data.

4. The non-transitory computer-readable storage medium of claim 1, wherein displaying the merged text comprises removing the first text and indicating differences between the merged text and the first text.

5. A device comprising:
   one or more processors operable to:
      send, to one or more servers in communication with the device via a network, at least a portion of a first frame of image data including at least a first captured textual item within a first bounding box corresponding to a region of the first frame;
      receive, from the one or more servers, first recognized text corresponding to the first captured textual item;
      send, to the one or more servers, at least a portion of a second frame of image data including at least a second captured textual item within a second bounding box corresponding to a region of the second frame;
      receive, from the one or more servers, second recognized text corresponding to the second captured textual item;
      compare first characters of the first recognized text with second characters of the second recognized text, wherein comparing the first characters with the second characters includes:
         determine an edit distance between the first recognized text and the second recognized text, and
         determine that the edit distance satisfies an edit distance threshold, wherein the edit distance threshold depends on a type of at least one of the first recognized text or of the second recognized text;
      determine an overlap of the first bounding box relative to the second bounding box;
      determine that the first captured textual item matches the second captured textual item based at least in part on (i) the comparison of characters of the first recognized text with characters of the second recognized text and (ii) the overlap;
      generate merged text based at least in part on the first recognized text and the second recognized text; and
      display, on a display, the merged text.

6. The device of claim 5, wherein displaying the merged text on the display at the device comprises:
   replacing previously displayed text with the merged text.

7. The device of claim 6, wherein the previously displayed text is replaced with the merged text when an update condition is satisfied, the update condition being satisfied when:
   the merged text includes one or more differences from the previously displayed text, and
   the merged text has a confidence level greater than a confidence level of the previously displayed text.

8. The device of claim 7, wherein the confidence level of the merged text is determined by one or more of: an optical character recognition engine processing the text or a semantic analysis of the text.

9. The device of claim 5, wherein displaying the merged text on the display at the device comprises:
   removing the previously displayed text and indicating differences between the merged text and the previously displayed text.

10. The device of claim 5, wherein at least a portion of the displayed text is actionable to cause a computing event to occur.

11. The device of claim 5, further comprising: a camera operable to capture the first frame and the second frame.

12. The device of claim 5, wherein generating the merged text comprises selecting a first portion of the first recognized text based at least in part on a first confidence level and selecting a second portion of the second recognized text based at least in part on a second confidence level.

13. A method comprising:
   sending, from a device to one or more servers in communication with the device via a network, at least a portion of a first frame of image data including at least a first captured textual item within a first bounding box corresponding to a region of the first frame;
   receiving, from the one or more servers, first recognized text corresponding to the first captured textual item;

sending, to the one or more servers, at least a portion of a second frame of image data including at least a second captured textual item within a second bounding box corresponding to a region of the second frame;

receiving, from the one or more servers, second recognized text corresponding to the second captured textual item;

comparing first characters of the first recognized text with second characters of the second recognized text, wherein comparing the first characters with the second characters includes:
 determining an edit distance between the first recognized text and the second recognized text, and
 determining that the edit distance satisfies an edit distance threshold, wherein the edit distance threshold depends on at least one of a type of the first recognized text or of the second recognized text;

determining an overlap of the first bounding box relative with the second bounding box;

determining that the first captured textual item matches the second captured textual item based at least in part on the comparison of characters of the first recognized text with characters of the second recognized text and on the overlap;

generating merged text based at least in part on the first recognized text and the second recognized text; and displaying, on a display at the device, the merged text.

14. The method of claim 13, wherein generating the merged text comprises selecting a first portion of the first recognized text based at least in part on a first confidence level and selecting a second portion of the second recognized text based at least in part on a second confidence level.

15. The method of claim 13, further comprising:
 performing a pre-processing operation on the first frame to determine that the first frame likely contains text.

16. The method of claim 13, wherein the first frame and the second frame are obtained from a video stream.

17. The device of claim 5, the one or more processors operable to:
 determine that the overlap satisfies a designated threshold, wherein determining that the first captured textual item matches the second captured textual item at least in part on the overlap includes determining that the overlap satisfies the designated threshold.

18. The method of claim 13, further comprising:
 determining that the overlap satisfies a designated threshold, wherein determining that the first captured textual item matches the second captured textual item at least in part on the overlap includes determining that the overlap satisfies the designated threshold.

* * * * *